Dec. 19, 1967  K. J. STETTEN  3,359,563
ELECTRON BEAM THERMAL IMAGING DISPLAY SYSTEM
Filed July 22, 1965

INVENTOR.
KENNETH J. STETTEN

BY Thomas I. Davenport
ATTORNEY

United States Patent Office 3,359,563
Patented Dec. 19, 1967

3,359,563
ELECTRON BEAM THERMAL IMAGING
DISPLAY SYSTEM
Kenneth J. Stetten, McLean, Va., assignor, by mesne assignments, to Westinghouse Electric Corporation, Pittsburgh, Pa., a corporation of Pennsylvania
Filed July 22, 1965, Ser. No. 474,115
9 Claims. (Cl. 346—76)

ABSTRACT OF THE DISCLOSURE

A display system utilizing heat generated on the surface of the face plate of a cathode ray tube by an electron beam. The beam selectively traverses areas of the surface in accordance with a variable source of information. The selectively traversed areas locally heat a film which has been conditioned or prepared by ultraviolet light and positioned in heat transfer relationship with the surface of the cathode ray tube.

---

This invention relates to an indicia related information display system and more particularly to a display system adapted to present rapidly changing information on a viewing screen or the like.

There are many situations wherein it is desired to project rapidly changing information on a viewing screen as is in an air traffic control center, a large manufacturing operation or other situation wherein a plurality of individuals desire the simultaneous receipt of information in a central area in order that rapid decisions may be made. Prior systems of this type are known, as for example in U.S. Patents 3,131,020 and 3,184,753, as well as copending application Ser. No. 378,603 of June 29, 1964, by Philip Ring. While these and other prior systems fulfill the functions for which they are intended, many have failed to fully utilize the properties of known types of light-sensitive films.

In recent years workers in this art have become acquainted with two types of direct print-out film. The first is termed photochromic or, synonomously, phototropic film which is initially transparent and has the property of forming a temporary image upon exposure to or excitation from ultra-violet light. The image formed thereon is dark and persists for a variable length of time (termed the persistence time) and then fades way. A second type of film, which may be regarded as one type of the more general phototropic film, is known as Kalvar film and is marketed by the Kalvar Corporation and described in several U.S. patents, among them 2,911,299 and 2,976,145. Kalvar film has the property of forming a latent image upon excitation from or exposure to ultra-violet light. This image is developed (made permanent) by the application of heat to those portions of the film which carry the latent image, with the heat being applied either subsequently, or, for direct print-out behavior, concurrently, to effect the nearly instantaneous expansion of nucleation centers. In such films, the latent image consists of bubble nucleation centers which expand to form bubbles upon the application of heat. These bubbles are of a different index at refraction than that of the film. The collection of such bubbles scatters incident light and thus gives rise to a semi-opaque area effectively of a different optical transmissivity than the remainder of the film.

In a display system employing either photochromic or Kalvar film, a cathode ray tube is usually employed as a source of indicia related radiation by coating the inside surface of the tube with a suitable phosphor layer. The phosphor layer emits ultra-violet light at those portions thereof variably struck by the tube's beam of electrons. This ultra-violet light is used to excite the film and produce images thereon, the images corresponding to the variable or rapidly changing indicia which is to be projected on a screen. Further, a fiber optic face plate is sometimes used to collect the phosphor generated ultra-violet light for more precise localized transmission to the film.

The efficiency of such an ultra-violet generating scheme is rather low, being of an order of magnitude of one percent, due to the low efficiency of phosphor in converting the kinetic energy of the electron beam into ultra-violet light. The practice of the present invention significantly increases the efficiency of the formation of images on the film, the efficiency being increased by a factor of approximately twenty due to the conversion of nearly all of the kinetic energy of the electron beam into heat upon its impingement on the face of the cathode ray tube.

According to the present invention, the above described properties of photochromic film and of Kalvar film are utilized in a novel manner to produce a variable indicia display system which will admit of a variety of useful applications, some of which have been above described. In general, it may be stated that according to the present invention heat instead of ultra-violet radiation is employed to produce an image.

According to one embodiment of the invention, a photochromic film is placed in contact with the outer face of a cathode ray tube, the face plate being rather thin. The photochromic film adjacent the face plate is completely and continuously exposed to ultra-violet radiation from an external source to thereby cause a darkening uniformly thereover. The heat generated by the incidence of the electron beam on the inside surface of the face plate of the cathode ray tube decreases, at localized areas, i.e., at the points of incidence, the persistence time of the photochromic film to thereby create a difference in optical transmissivity of the film, yielding an image. Those localized areas which are heated by the electron beam are those which have been traced out by the moving electron beam in accordance with whatever information, such as a number, letter, or the like, is desired for viewing. Thus the requirement for a phosphor layer in the cathode ray tube is obviated.

In another embodiment of the invention, Kalvar type film is uniformly pre-exposed, to ultra-violet light and the film is placed over a cathode ray tube having a thin face plate. Here, use is again made of the heat generated by the incidence of the electron beam on the cathode ray tube face plate and this localized heating selectively develops the nucleation centers of the Kalvar film to thereby form a permanent image of the desired information.

A more detailed description of the invention will now be given.

In the drawings:
FIGURE 1 is a partially schematic view of a cathode ray tube in combination with a photochromic film and a thin reflecting layer exteriorly of the face plate and in contact with one surface of the photochromic film, the tube adapted for use in the projection system of FIGURE 2.

Figure 1:
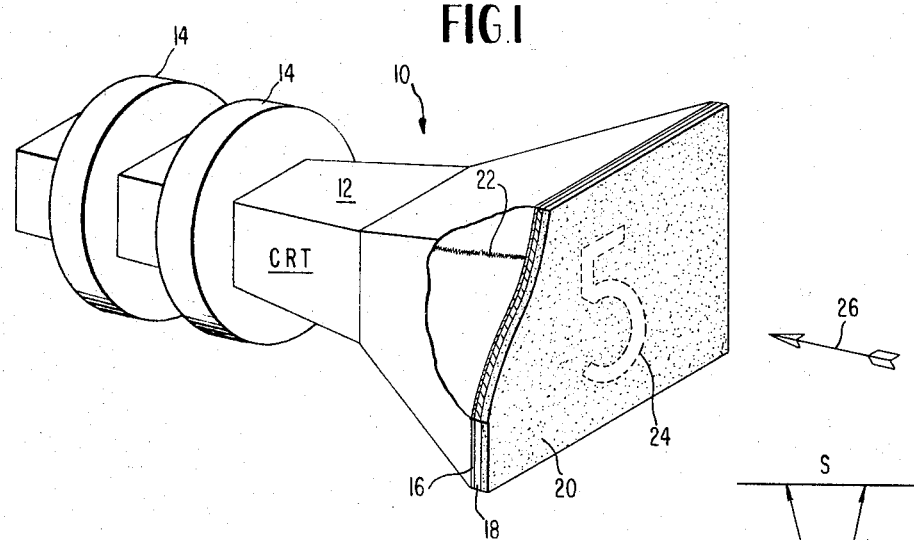

Referring now to FIGURE 1 of the drawings, the numeral 10 denotes generally an information display device including a cathode ray tube (CRT) 12 of generally conventional construction. The CRT includes an electron gun within it (not illustrated) and conventional electron beam controls 14. As is known to workers in this art, the controls 14 deflect the electron beam generated by the electron gun in any of a great number of conventional ways to trace out a desired display on the face plate.

The numeral 16 denotes the face plate or front portion of the CRT and is purposely made very thin. Preferably, the face plate 16 is formed of mica approximately 1/1000 of an inch thick. For reasons which will occur presently, it is desirable that the face plate be thin and formed of a material which has a very poor heat conductivity to inhibit spreading of the image.

The numeral 18 denotes a thin layer of a reflecting material such as aluminum and may conveniently be formed on the face plate by a vacuum deposition process. The layer is so thin that its thermal conduction effects are negligible. The layer 18 is deposited or placed directly against the exterior surface of face plate 16 and is sandwiched between the face plate and photochromic film 20. The photochromic film 20 may be of conventional composition such as quasi-solid solution of a photochromic dye carried by a suitable support member or a plastic film impregnated with a photochromic dye. Alternatively, it may assume the form of a thin liquid film of a photochromic dye in a suitable holder, as illustrated and described in copending application Ser. No. 460,418, by Kenneth J. Stetten.

The numeral 22 denotes the electron beam formed by an electron gun within the CRT and the numeral 24 denotes a figure traced out by the electron beam by the controls on the CRT. The arrow 26 denotes ultra-violet light incident upon an irradiating film 20 and may be supplied by any convenient source.

In operation of the device 10 illustrated in FIGURE 1, ultra-violet light is incident upon the entire surface of the photochromic film 20, thus causing it to darken uniformly thereover. With continued incidence of the ultra-violet light, assume now that it is desired to form the numeral 5 on the face of the film 20. The controls for the CRT now cause the electron beam 22 to trace out on the interior surface of the face plate 16 a figure which when viewed from the exterior surface of the face plate would be the numeral 5. During the tracing process, the electron beam 22 in its impingement upon the interior of face plate 16 generates heat at localized points or areas of incidence. This represents the conversion of the kinetic energy of the electrons which form the electron beam into heat energy. The heat at the localized area passes from the inside portion of face plate 16 to the exterior surface thereof, passes through reflecting layer 18 and locally heats the film 20. Thus, localized portions of film 20 experience a temperature increase and this temperature increase causes a chemical reaction in the photochromic film which results in a loss of opacity or a loss of darkening at the localized areas. The numeral 5 appears as a light element on a dark background. This effect follows from the property of presently available photochromic films of nearly instantly reverting to transparency, even in the presence of ultra-violet light, at temperatures in the neighborhood of 210° F. To inhibit image spreading due to heating of the mica face plate 16, the electron beam is interrupted with regard to any one spot on the face plate during operation.

Figure 2:
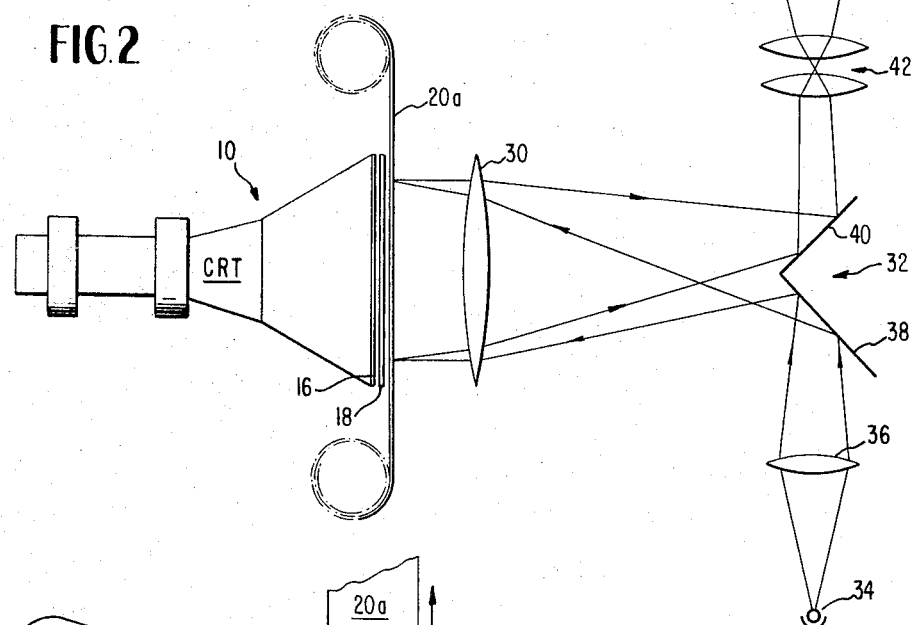
FIGURE 2 is a partially schematic view of an indicia related projection system in combination with the elements illustrated in FIGURE 1 of the drawings.

Referring now to FIGURE 2 of the drawings, the numeral 20a denotes a strip of photochromic film which may be either movable as by mounting its ends on movable reels or which may be stationary, as illustrated in FIGURE 1. The numeral 30 denotes a collecting lens and the numeral 32 denotes generally an optical projection system. The system 32 includes a source 34 of both white and ultra-violet light. This source is illustrated as a single source, although in practice the sources for these two kinds of light may be different. The light from source 34 passes through a collecting lens 36 for impingement upon a reflecting surface 38, as in the manner of a common mirror. The light reflected from surface 38 passes to lens 30 for projection on the photochromic film. Here, it is seen that the function of the reflecting film or layer 18 is to reflect any light which passes through the photochromic film. Light which is reflected passes through lens 30 to reflecting surface 40 and thence through a lens system 42 for final projection on a viewing screen S.

Assume now that the same character shown in FIGURE 1 has been written on the film 20a of FIGURE 2. As a consequence of the description of FIGURE 1, it will be seen that the ultra-violet light from source 34, in conjunction with the described properties of photochromic film and the action of the electron beam of the CRT all act to produce the numeral 5 on the film. The numeral will appear light on a dark background. The white light from source 34 traverses the optical path as illustrated and the viewer will see the projection of the numeral 5 on the screen S, with the projection being a white or light numeral 5 on a dark or black background. The reader will observe that the white light from mirror 38 will be absorbed by the film 20a at all portions except those portions made transparent by the action of heat on localized portions of the film.

If desired, the reflecting film 18 need not be applied. In such a case, the viewer(s) look directly at the photochromic film placed over the face of the CRT. The reflecting film is employed in the projection system shown in FIGURE 2.

The invention above described is also susceptible of use with Kalvar film. In this case, the Kalvar film is completely pre-exposed to ultra-violet light, thereby fixing uniformly thereover nucleation centers which are adapted to form small bubbles upon the application of heat to the film. The Kalvar film is now placed, as before, in thermal communication with the face plate of the CRT shown in FIGURES 1 and 2 of the drawings, with the exception that by virtue of the permanency of the image, it is placed so as to continuously run over the face plate of the CRT as indicated at FIGURE 2. Now, the source 34 of FIGURE 2 consists of white light only, and again the CRT traces out the desired numeral, letter, or other information on the interior of the face plate 16. The heat generated by the incidence of the electron beam on the face plate serves to fix or to develop the Kalvar film by forming bubbles from the nucleation centers. It will be understood that the formation of these bubbles will be selective and will occur only at those areas which are immediately adjacent the traced out portions on face plate 16. As illustrated in FIGURE 2 of the drawings, the Kalvar film may be used in the identical projection apparatus previously described and a duplicate description will therefore not be here set out. Again, with Kalvar film, as well as with photochromic film, the reflecting coating 18 is required only when use of a projection system such as that of FIGURE 2 is desired.

In distinction to the display system employing photochromic film the display system using Kalvar film yields a dark-on-light image.

The Kalvar film may, in addition to pre-exposure to ultra-violet light to effect bubble nucleation centers uniformly thereover, also be pre-developed as by contacting it with hot rollers at its place of manufacture to cause bubble formation uniformly thereover. In this instance, subsequent indicia related heating will locally destroy the opacity of the film to yield contrast for viewing. Here, the projected information would be light on a dark background.

Figure 3:
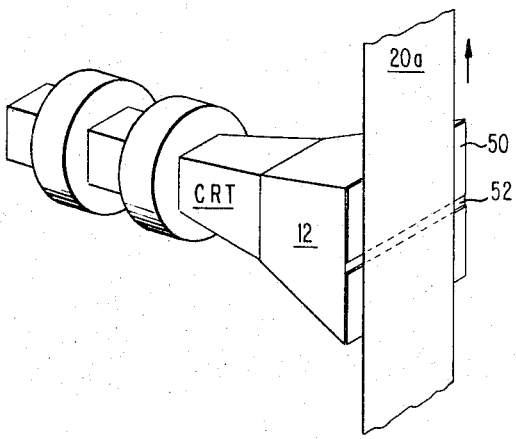
FIGURE 3 is a perspective view, similar to FIGURE 1, of a facsimile display device.

FIGURE 3 of the drawings illustrates an application of the above described invention to a facsimile reproduction system. As mask 50 having a narrow slot 52 therein is placed over the face of CRT 12'. The CRT 12' is provided with an input source which controls the location and intensity of the electron beam along the slot 52. As the film strip 20a moves across the slot in the indicated direction, the electron beam scans the slot 52 and traces out the desired display indicia, such as, for example, price quotations. Either photochromic film or Kalvar type film may be employed in the manner set forth above. It will be understood that the electron beam is directed only at that portion of the face plate of CRT 12' corresponding to the slot 52.

What is claimed is:

1. An indicia related information display system including a film, said film exhibiting localized variations in optical transmissivity upon the application at localized areas thereof of temperatures greater than the ambient temperature of said film, a surface, means for selectively heating said surface over indicia related portions thereof, said surface being in thermal communication with said film, said indicia related source of heat adapted to selectively traverse areas of said surface in accordance with a variable source of information.

2. The system of claim 1 wherein said film is a photochromic film having the property of darkening upon exposure to ultra-violet light.

3. The system of claim 1 wherein said film is a photochromic film having the property of darkening upon exposure to ultra-violet light and wherein said surface is the face plate of a cathode ray tube.

4. The system of claim 3 wherein said cathode ray tube is provided with a thin reflecting film on the exterior portion of its face plate with the said reflecting film being positioned between said photochromic film and the face plate.

5. The system of claim 1 wherein said film has the property of forming latent images upon exposure to ultra-violet light with said latent images being developed by the application of heat to said film.

6. The system of claim 1 wherein said film has the property of forming latent images upon exposure to ultra-violet light with said latent images being developed by the application of heat to said film, and wherein said surface is the face plate of a cathode ray tube.

7. The system of claim 6 wherein said cathode ray tube is provided with a thin reflecting film on the exterior portions of its face plate, with the said reflecting film being positioned between said film and the face plate.

8. The system of claim 4 including an external source of ultra-violet radiation incident upon said first mentioned film.

9. The system of claim 7 wherein said film is exposed uniformly thereover to ultra-violet light.

References Cited

UNITED STATES PATENTS

| | | | |
|---|---|---|---|
| 3,131,020 | 4/1964 | Bertram et al. | 346—110 |
| 3,184,753 | 5/1965 | Koster | 346—110 |
| 3,235,658 | 2/1966 | Levy | 178—6.7 |
| 3,258,525 | 6/1966 | Piatt et al. | 346—110 |
| 3,264,961 | 8/1966 | Tuttle et al. | 95—12 |
| 3,282,183 | 11/1966 | Tuttle et al. | 95—12 |

RICHARD B. WILKINSON, *Primary Examiner.*

JOSEPH W. HARTARY, *Assistant Examiner.*